United States Patent [19]
Wintrich et al.

[11] Patent Number: 5,255,616
[45] Date of Patent: Oct. 26, 1993

[54] PROCESS AND DEVICE FOR WASTE INCINERATION

[75] Inventors: Franz Wintrich, Essen; Michael Herbermann, Gladbeck, both of Fed. Rep. of Germany

[73] Assignee: RWE Entsorgung Aktiengesellschaft, Fed. Rep. of Germany

[21] Appl. No.: 29,470

[22] Filed: Mar. 11, 1993

Related U.S. Application Data

[63] Continuation of Ser. No. 769,540, Oct. 1, 1991, abandoned.

[30] Foreign Application Priority Data

Oct. 5, 1990 [DE] Fed. Rep. of Germany ....... 4031493

[51] Int. Cl.$^5$ .............................................. F23G 5/00
[52] U.S. Cl. ..................................... 110/346; 110/216; 110/246; 110/345; 95/273

[58] Field of Search ............... 110/346, 216, 246, 226, 110/217, 345; 422/168, 177; 55/97

[56] References Cited

U.S. PATENT DOCUMENTS

| | | | |
|---|---|---|---|
| 3,403,643 | 10/1968 | Dénig | 110/228 |
| 4,188,892 | 2/1980 | Kiefer et al. | 110/246 X |
| 4,303,477 | 12/1981 | Schmidt et al. | 110/246 X |
| 4,762,074 | 8/1988 | Sorensen | 110/346 |
| 4,928,606 | 5/1990 | Muller | 110/346 X |
| 4,957,050 | 9/1990 | Ho | 110/346 |

*Primary Examiner*—Edward G. Favors
*Attorney, Agent, or Firm*—Connolly & Hutz

[57] ABSTRACT

The instant invention relates to a process and device for waste incineration with an oxidation agent, which consists of oxygen in a higher concentration than in air, whereby the combustion gases pass through a filter, which is resistant to high temperatures and which is arranged behind the combustion zone and whereby the gases are cooled subsequently.

6 Claims, 1 Drawing Sheet

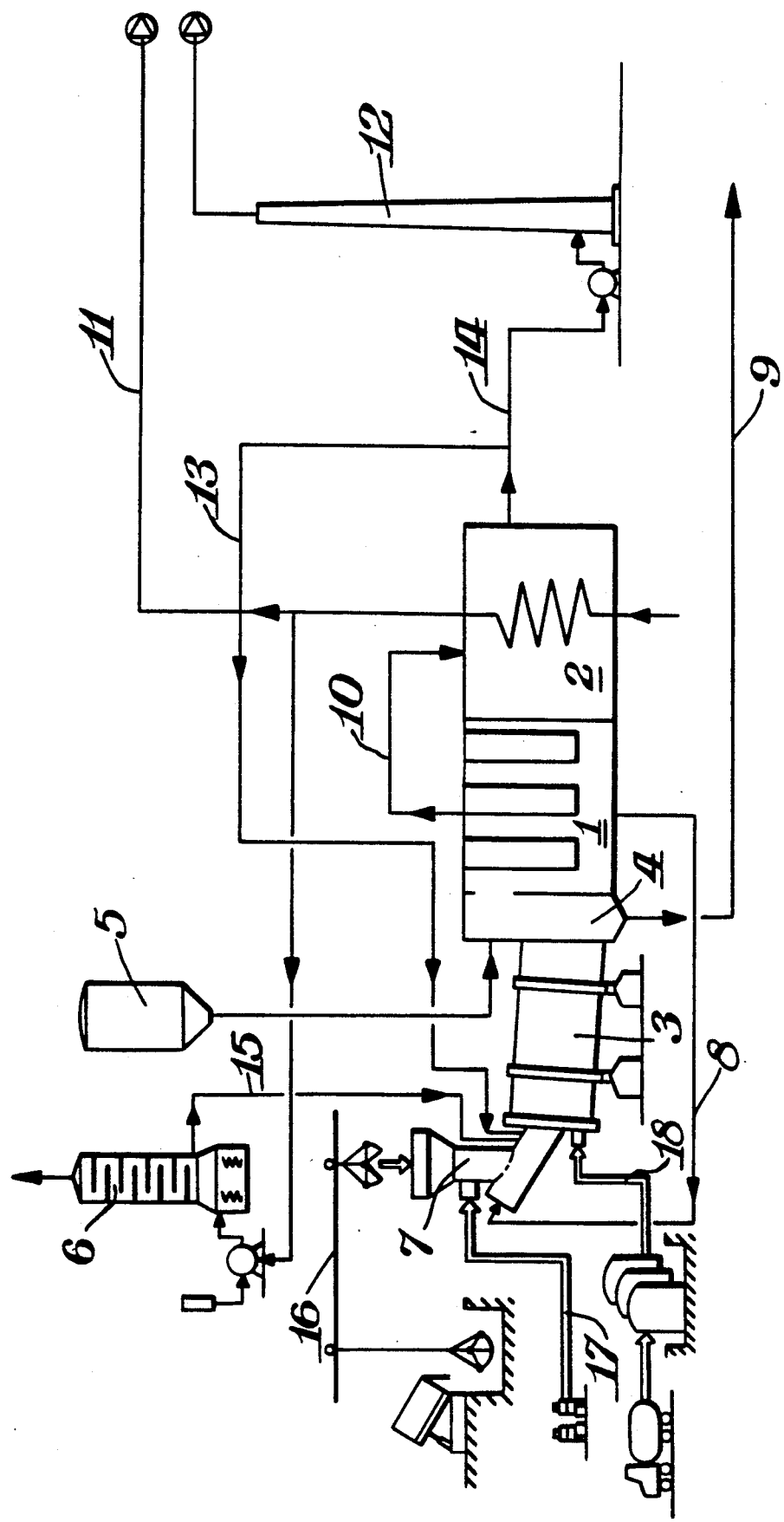

PROCESS AND DEVICE FOR WASTE INCINERATION

CROSS-REFERENCE TO RELATED APPLICATION

The present application is a continuation of application Ser. No. 07/769,540, filed Oct. 1, 1991 abandoned.

The instant invention relates to a process and device for waste incineration with an oxidation agent, which consists predominently of oxygen, whereby the combustion gases pass through a filter, which is resistent to high temperatures and which is arranged behind the combustion zone and whereby the gases are cooled subsequently.

Waste incineration with oxigen, which is present in a higher concentration than in air is known.

In DE-PS 3735061 a process is disclosed, wherein, in order to reduce the quantity of flue gas and to increase the flame temperature, an oxidation gas is applied with more than 50% of oxygen, preferably with 99% of oxygen. The high flue gas temperature of approximately 1800° C. is used in a waste heat boiler for the production of steam. By addition of metal oxids, acids, which are formed, for example hydrogen chloride are chemicaly bound. Subsequently dust, which is present in the flue gas is separated in a gas purification unit.

The further development of this process is disclosed in DE-OS 3813817.

In order to avoid too high temperatures in the combustion chamber as a consequence of the high concentration of oxygen used, part of the cooled flue gas is recycled to the combustion chamber.

It is known to a person skilled in the art that in incinerations at high temperatures dioxine and chlorinated dibenzofuranes are not stable and are burned in the presence of oxygen.

This has led to the conclusion that if a temperature higher than 1250° C. is maintained during waste incineration, no dioxine respectively chlorinated dibenzofuranes are present in combustion gases.

In the meantime it has become known, that this assumption is not correct.

In contrast, investigations have shown, that after cooling the combustion gases in the temperature range of 200° to 400° C., preferably at approximately 300° C., in the presence of excess oxygen and in the presence of catalyticaly active fly ash chlorine is formed along the lines of the Deacon-process from hydrogen chloride, which is formed during combustion. In particular copper components are very active catalysts. This is exemplarily represented by the following reaction equations:

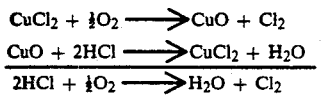

In the presence of carbon and catalytically active metal compounds and in the presence of excess oxygen chlorine triggers the formation of dioxine respectively dibenzofuranes even in the absence of chlorine containing organic precursers. This dioxine—respectively dibenzofurane formation is also known as "de novo"-synthesis, (see for example VDI-Berichte 634 "Dioxin, H. Hagenmeier, H. Brunner, R. Hack, M. Kraft, 1987, pages 557–584, VDI-Verlag GmbH, Düsseldorf).

The present invention has surprisingly and non-obviously shown, that it is possible to work with high concentrations of oxygen in waste incineration, with the result, that no dioxine and/or chlorinated dibenzofurane is present in the combustion gases, characterized in that the filter zone is arranged behind the combustion zone, that in the filter zone the dust and ash present in the combustion gas are filtered off and that subsequently the combustion gas is cooled in a cooling zone.

The FIGURE exemplarily represents the inventive process and the device for carrying out this process.

The combustion in the presence of high concentrations of oxygen has several advantages, like reduction of the total quantity of combustion gas, lower energy consumption, reduction of the emission of toxic agents and in addition the combustion gas purification unit has a smaller size.

Since on the other hand, excess of oxygen as outlined above, favours the formation of dioxine and chlorinated dibenzofuranes, this disadvantage impairs the use of high oxygen concentrations in waste incineration.

The present invention has overcome this disadvantage by filtration of the still very hot combustion gases. Non-obviously it has been shown that by separation of the fly ash in the combustion gas, even in the presents of high oxygen concentrations, the "de novo"-synthesis can be completely eliminated, with the result, that dioxine and chlorinated dibenzofuranes can no longer be detected even with the most sensitive analytical devices respectively methods.

(It is known, that the maxium permissible concentration of dioxine in combustion gases or other waste gases is $0,1 \times 10^{-9}$ gm$^3$ ($10^{-9}$ g=1 ng).

The inventive filters must be resistent to very high temperatures. Suitable devices are ceramic filters or filters consisting of high temperature resistant fiber material. It is known to the person skilled in the art that such fibers consist of metal oxides and in particular contain $Al_2O_3$ and/or $SiO_2$, however also other metal oxides can be additionally present, like for example $Cr_2O_3$, $ZrO_2$, $TiO_2$, $GeO_2$, $SnO_2$ and others. Also metal fibers and mixtures of fibers of different materials are suitable according to the invention.

The materials namened above are not to be considered as limiting, since the pertinant state of the art can be found in the technical literature and in advertising folders of companys which are active in the field of high temperature resistant materials. Newly developed high temperature resistant materials and fibers are also embraced by the instant invention.

Arrangement and shape of the filters can vary in a wide range. It is essential however that the combustion gases are passed completely or at least to the highest possible extent through the filter. According to the invention single filters can be applied or filter arrangements consisting of at least two filters.

The filter construction and shape has not to be elucidated in detail, since an extensive state of the art is available, in particular for technical applications. Also newly developed filters are embraced by the instant invention, as long as they have the capability to completely or almost completely separate the solids respectively fly ash or dust particles in the combustion gases.

Waste incinerations are carried out in a broad temperature range, namely from 600° to 2000° C. This range is also valid for the instant invention. A preferred range is 800° to 2000° C. and a particularly preferable range is 1200° to 2000° C.

Basically the combustion can also be carried out above 2000° C. For economical reasons and with regard to the materials used, such high temperatures however are only of minor interest.

The oxygen concentration may be between the oxygen concentration of air and pure oxygen. Preferable is a concentration of 50 to 100 volume-%, particularly preferable a range of 75 to 100 volume-%.

The present invention is exemplarily explained in more detail with the aid of the figure.

(1) represents the filter zone, which is directly arranged behind the rotary kiln (3) and separated from the latter only by a slag separator (4). The filtered combustion gas passes through piping (10) into the cooling zone (2), where the combustion gas is cooled by production of steam. The steam leaves the unit through piping (11).

Subsequently the combustion gas passes through (14) to chimney (12) into the atmosphere. Part of the cooled combustion gas is recycled through tubing (13) into the rotary kiln (3) for the purpose of temperature control.

The various types of waste like sludge, pastes, garbage, used oils, solvents, plastics and numerous other wastes pass through (16) (17) (18) and gate 7 into the rotary kiln (3).

From air separation unit (6) oxygen is introduced through piping (15) into the rotary kiln (3) serves as an additive storage, for example for ammonium salts, chalk, calcium carbonate, magnesium carbonate and others. The additive selection and the quantity used depend on the type of waste materials fed to the combustion unit and are known to a person skilled in the art.

The dust which is selected in filter zone (1) is recycled through piping (8) to the rotary kiln and finally is obtained as a slag through piping (9).

As an example 15 t/h of waste and 15,000 kg/h of oxygen are introduced into the rotary kiln operated at 1800° C. 28000 nm$^3$h are transferred through the filter zone into the cooling zone. The combustion gas leaves the cooling zone with a temperature <200° C. and passes to the chimney.

What is claimed is:

1. A process for waste incineration comprising the steps of providing a combustion zone, introducing waste into the combustion zone, supplying a gas mixture to the combustion zone, the gas mixture containing oxygen at a concentration higher than the oxygen concentration present in air, incinerating the waste in the combustion zone, arranging a high temperature resistant filter selected from the group consisting of a ceramic filter and a filter of high temperature resistant fibers downstream of the combustion zone at such a distance to the combustion zone that dust and ash present in combustion gas are filtered off of the gas at a temperature higher than 400° to thereby prevent the formation of dioxines and dibenzofurans even in the presence of high oxygen concentrations, and subsequently cooling the combustion gas in a cooling zone.

2. A process as in claim 1 wherein the gas mixture introduced into the combustion zone contains oxygen at a concentration higher than in air up to 75 to 100 volume percent.

3. A process as in claim 1 wherein the waste is incinerated in the combustion zone at a temperature in the range of 800° to 2000° C.

4. A process as in claim 1 wherein the waste is incinerated in the combustion zone at a temperture in the range of 1200° to 2000° C.

5. A process as in claim 1 wherein the combustion zone is a rotary kiln.

6. A process as in claim 1 including the step of separating slag from the incinerated waste between the combustion zone and the filter zone.

* * * * *